US009132545B2

(12) United States Patent
Ogawa et al.

(10) Patent No.: US 9,132,545 B2
(45) Date of Patent: Sep. 15, 2015

(54) APPARATUS FOR CONTROLLING MOBILE ROBOT

(71) Applicant: HONDA MOTOR CO., LTD., Tokyo (JP)

(72) Inventors: Naohide Ogawa, Wako (JP); Yoko Saito, Wako (JP); Taro Yokoyama, Wako (JP); Masaki Aihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 13/890,386

(22) Filed: May 9, 2013

(65) Prior Publication Data

US 2014/0005830 A1    Jan. 2, 2014

(30) Foreign Application Priority Data

Jun. 28, 2012 (JP) .................................. 2012-145688

(51) Int. Cl.
*G05B 19/18* (2006.01)
*B25J 9/16* (2006.01)
*B25J 13/00* (2006.01)
*B62D 57/032* (2006.01)

(52) U.S. Cl.
CPC .............. *B25J 9/1602* (2013.01); *B25J 13/003* (2013.01); *B62D 57/032* (2013.01); *Y10S 901/01* (2013.01)

(58) Field of Classification Search
CPC .... B25J 9/1664; B25J 9/1661; G05B 19/425; G05B 2219/45083
USPC .......................... 700/245, 248, 205, 252, 257
See application file for complete search history.

(56) References Cited

U.S. PATENT DOCUMENTS

| | | | | |
|---|---|---|---|---|
| 6,969,965 | B2 * | 11/2005 | Takenaka et al. | 318/568.12 |
| 2002/0120362 | A1 * | 8/2002 | Lathan et al. | 700/245 |
| 2002/0123826 | A1 * | 9/2002 | Toki | 700/245 |
| 2002/0137425 | A1 * | 9/2002 | Furumura | 446/175 |
| 2002/0198717 | A1 * | 12/2002 | Oudeyer et al. | 704/270 |
| 2003/0233170 | A1 * | 12/2003 | Ohtani et al. | 700/245 |
| 2004/0015265 | A1 * | 1/2004 | Asano et al. | 700/245 |
| 2004/0019485 | A1 * | 1/2004 | Kobayashi et al. | 704/260 |
| 2004/0199292 | A1 * | 10/2004 | Sakagami et al. | 700/259 |
| 2004/0210345 | A1 * | 10/2004 | Noda et al. | 700/245 |
| 2006/0004486 | A1 * | 1/2006 | Yoshikawa et al. | 700/245 |
| 2006/0017384 | A1 * | 1/2006 | Setoguchi et al. | 313/582 |
| 2006/0126918 | A1 * | 6/2006 | Oohashi et al. | 382/153 |

(Continued)

FOREIGN PATENT DOCUMENTS

JP    4246638    4/2009
JP    4914703    4/2012

*Primary Examiner* — Ian Jen
(74) *Attorney, Agent, or Firm* — Rankin, Hill & Clark LLP (57) ABSTRACT

In an apparatus for controlling a mobile robot having leg locomotion mechanisms for traveling and walking and work mechanisms both connected to a body, actuators for driving them, and a controller for controlling the operation of the locomotion mechanisms and work mechanisms by supplying the actuators with a control value calculated by multiplying a deviation between a detected value and a desired value by a gain and to control operation of a speech input/output unit to recognize a human voice inputted through a microphone and utter a generated response to the human voice from a speaker, the controller calculates the gain of the control value to be supplied to at least one of the actuators at a minimum value when controlling only the operation of the speech input/output unit.

12 Claims, 8 Drawing Sheets

(56) References Cited

U.S. PATENT DOCUMENTS

| | | | |
|---|---|---|---|
| 2006/0173684 A1* | 8/2006 | Fischer et al. | 704/254 |
| 2006/0247825 A1* | 11/2006 | Omote | 700/245 |
| 2007/0150106 A1* | 6/2007 | Hashimoto et al. | 700/245 |
| 2008/0071540 A1* | 3/2008 | Nakano et al. | 704/251 |
| 2010/0017034 A1* | 1/2010 | Nakadai et al. | 700/258 |
| 2010/0034397 A1* | 2/2010 | Nakadai et al. | 381/58 |
| 2010/0179688 A1* | 7/2010 | Kwon | 700/245 |
| 2014/0214204 A1* | 7/2014 | Toshimitsu et al. | 700/253 |

* cited by examiner

APPARATUS FOR CONTROLLING MOBILE ROBOT

BACKGROUND

1. Technical Field

This invention relates to an apparatus for controlling a mobile robot, more particularly to an apparatus for improving speech recognition performance.

2. Background Art

In recent years, many types of mobile robots have been developed. There is proposed a technique for a mobile robot having leg locomotion mechanisms for walking operation and work mechanisms for working operation connected to a body, actuators such as electric motors for driving these mechanisms, and a speech input/output unit including a microphone and speaker, which technique is configured to control the operation of the speech input/output unit to recognize speech received through the microphone and utter a generated response from the speaker by supplying the actuators with control values obtained by multiplying deviations between desired values and detected values by gains, as taught, for example, by Japanese Patent No. 4914703.

SUMMARY

In the case of providing leg locomotion mechanisms or the like connected to the body for performing walking operation, as in the mobile robot described in the reference, the actuator gains need to be calculated so as to respond to the required walking operation and the like. When a calculated gain is high, the resulting increase in the driving sound of the actuator degrades the speech recognition performance of the speech input/output unit.

In the mobile robot control, the gains must therefore be calculated with consideration to the speech recognition performance of the speech input/output unit. However, the technique described in the reference does not teach or suggest anything in this regard.

An object of this invention is to overcome the aforesaid problem by providing an apparatus for controlling a mobile robot having actuators adapted to drive locomotion mechanisms for walking operation and the like connected to a body and a speech input/output unit, which the apparatus calculates gains with consideration to the speech recognition performance of the speech input/output unit.

In order to achieve the object, embodiments of this invention provides in a first aspect an apparatus for controlling a mobile robot having a body, leg locomotion mechanisms for walking operation and work mechanisms for working operation both connected to the body, a plurality of actuators for driving the leg locomotion mechanisms and work mechanisms, a speech input/output unit including a microphone and a speaker, and a controller adapted to control the operation of the locomotion mechanisms and work mechanisms by supplying the plurality of actuators with a control value which is calculated by multiplying a deviation between a detected value and a desired value by a gain and to control operation of the speech input/output unit to recognize human voice inputted through the microphone and utter a generated response to the recognized human voice from the speaker, wherein the improvement comprises: the controller calculates the gain of the control value to be supplied to at least one of the plurality of actuators at a minimum value when controlling only the operation of the speech input/output unit.

In order to achieve the object, an embodiment of this invention provides in a second aspect a method for controlling a mobile robot having a body, leg locomotion mechanisms for walking operation and work mechanisms for working operation both connected to the body, a plurality of actuators for driving the leg locomotion mechanisms and work mechanisms, a speech input/output unit including a microphone and a speaker, and a controller adapted to control the operation of the locomotion mechanisms and the work mechanisms by supplying the plurality of actuators with a control value which is calculated by multiplying a deviation between a detected value and a desired value by a gain and to control operation of the speech input/output unit to recognize human voice inputted through the microphone and utter a generated response to the recognized human voice from the speaker, comprising the step of: calculating the gain of the control value to be supplied to at least one of the plurality of actuators at a minimum value when controlling only the operation of the speech input/output unit.

DESCRIPTION OF EMBODIMENT

An embodiment for implementing an apparatus for controlling a mobile robot according to this invention is explained with reference to the drawings in the following.

Figure 1:
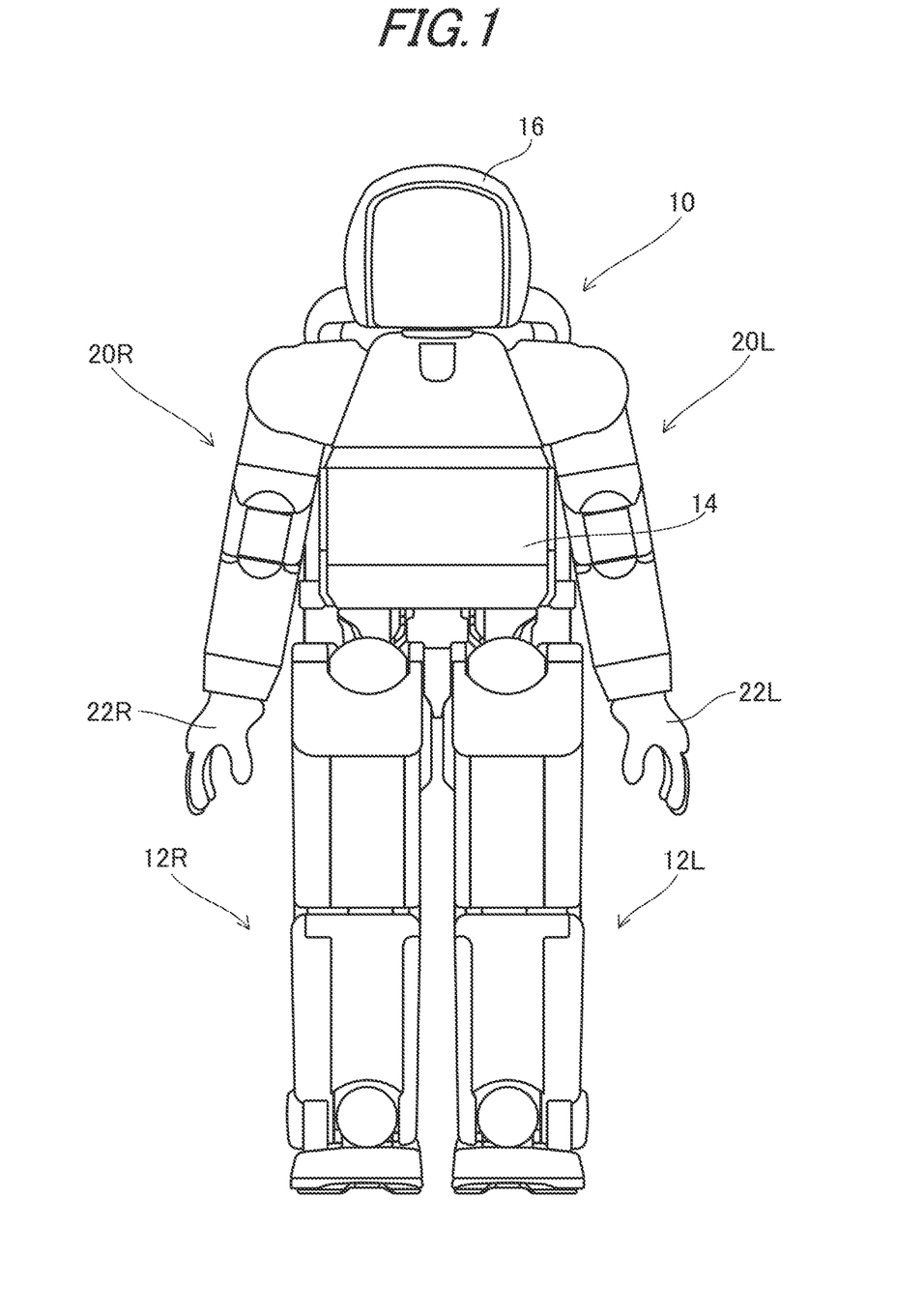
FIG. 1 is a front view of a robot on which an apparatus for controlling a mobile robot according to an embodiment of this invention is premised.
Figure 2:
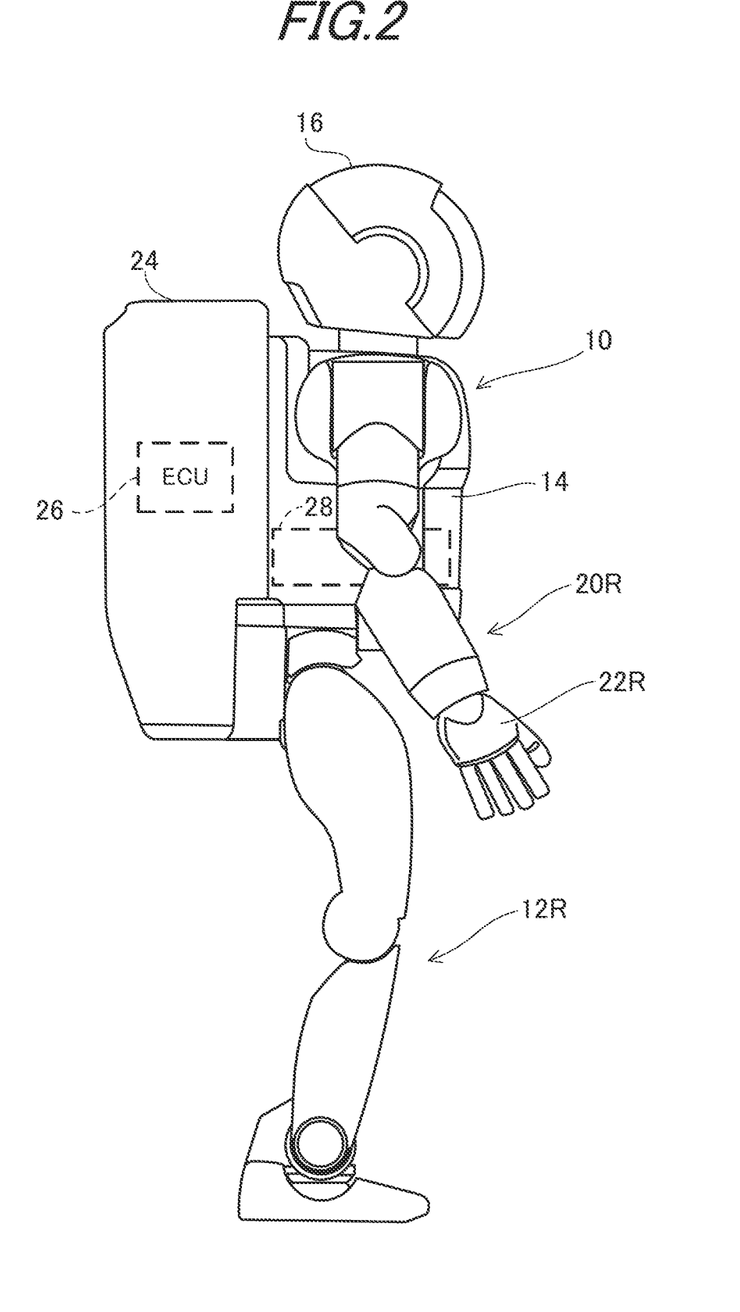
FIG. 2 is a side view of the robot shown in FIG. 1.
Figure 3:
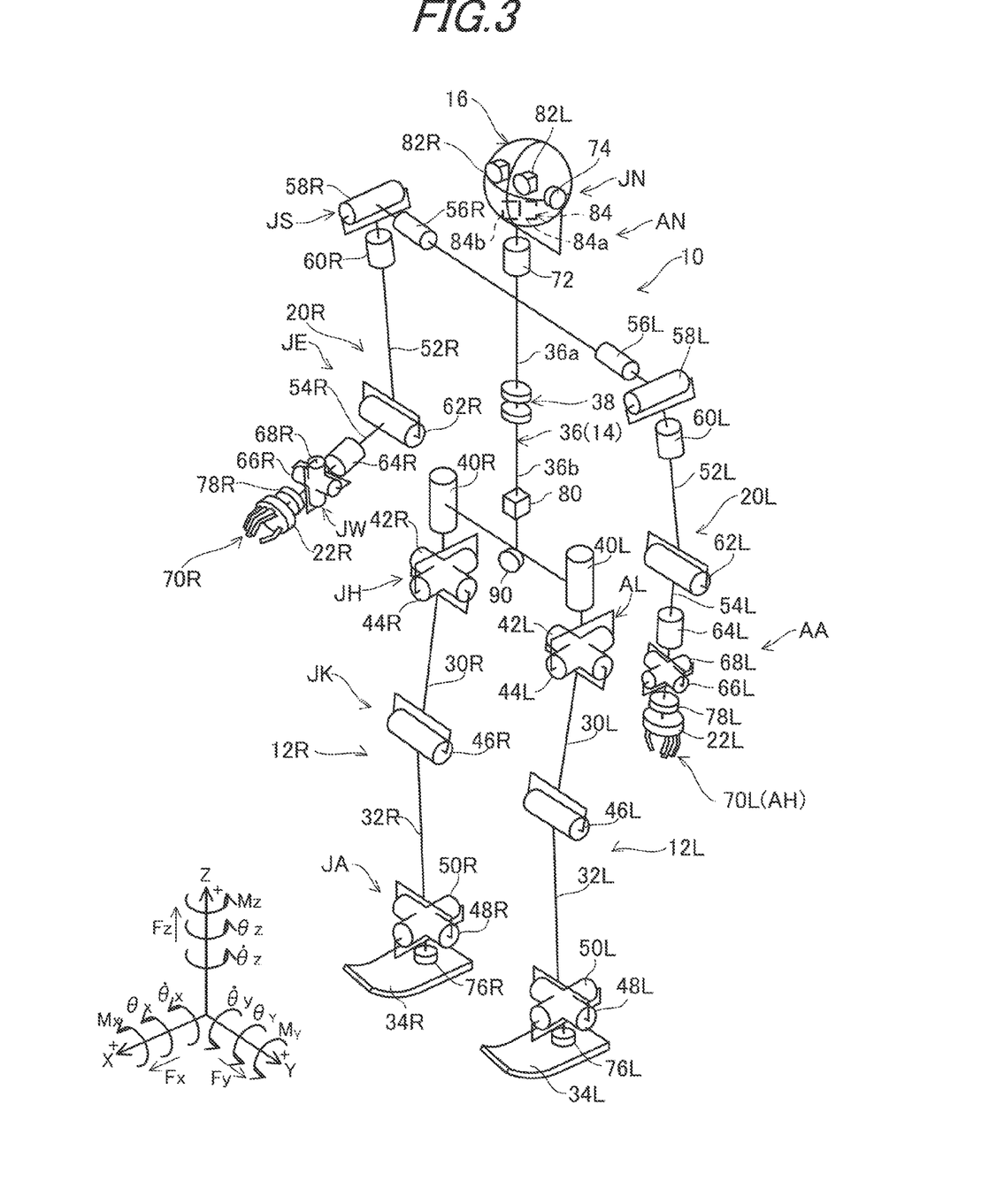
FIG. 3 is a schematic diagram showing the skeleton of the robot shown in FIG. 1.
Figure 4:
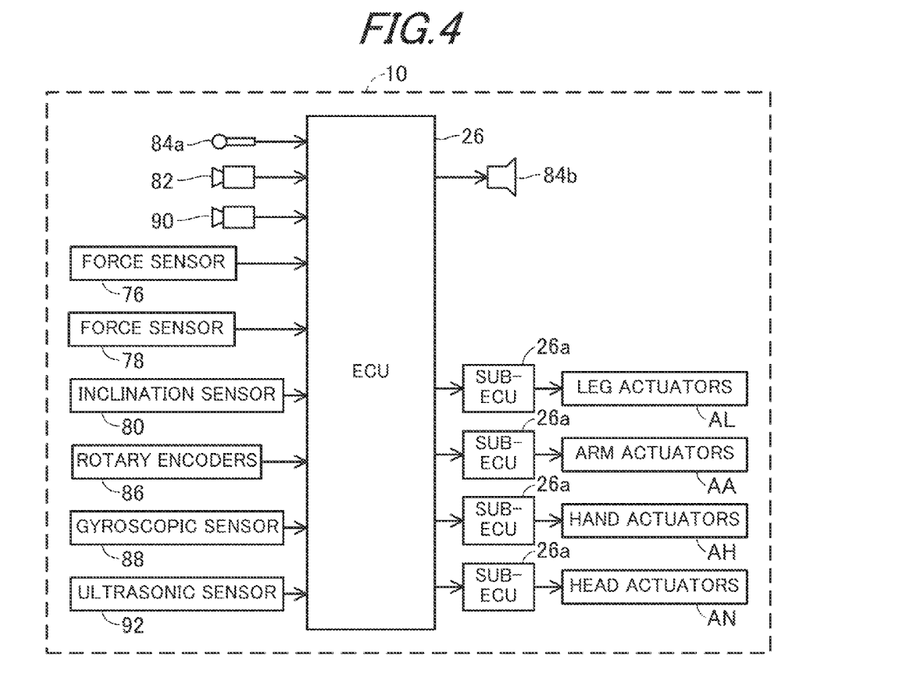
FIG. 4 is a block diagram showing input/output relations of an electronic control unit (ECU) shown in FIG. 2.

FIG. 1 is a front view of a robot on which an apparatus for controlling a mobile robot according to an embodiment of this invention is premised; FIG. 2 is a side view of the robot shown in FIG. 1; FIG. 3 is a schematic diagram showing the skeleton of the robot shown in FIG. 1; and FIG. 4 is a block diagram showing input/output relations of an electronic control unit (ECU) installed in the robot shown in FIG. 1.

As shown in FIG. 1, a legged mobile robot (hereinafter sometimes called simply "robot") 10 is equipped with multiple (two) legs, namely with left and right legs (locomotion mechanisms) 12L, 12R (Here and hereinafter L and R are used to indicate left and right sides). The legs 12L, 12R are connected to the bottom of a body (trunk) 14. A head 16 is connected to the top of the body 14 and multiple (two) arms, namely left and right arms (work mechanisms) 20L, 20R are connected to opposite sides of the body 14.

Hands (end effectors) 22L, 22R are connected to the distal ends of the left and right arms 20L, 20R. In this embodiment, the mobile robot is exemplified by a humanoid legged mobile robot having two legs 12 and two arms 20 and stands to a height of approximately 1.3 m.

As shown in FIG. 2, a storage unit 24 is mounted on the back of the body 14. The storage unit 24 accommodates, inter alia, an Electronic Control Unit (ECU: controller) 26. A battery 28 is housed inside the body 14.

The internal structures of the robot 10 will be explained with reference to FIG. 3, with primary focus on the joints. Since the illustrated robot 10 is laterally symmetrical, affixation of L and R will be omitted hereinafter.

The left and right legs 12 are each equipped with a thigh link 30, a shank link 32, and a foot member 34. The thigh link 30 is connected to the body 14 through a hip (crotch) joint JH. The thigh link 30 and shank link 32 are connected through a knee joint JK, and the shank link 32 and foot member 34 are connected to through an ankle joint JA.

The body 14 is shown schematically in FIG. 3 as a body link 36. The body link 36 (body 14) comprises an upper section 36a and a lower section 36b connected through a joint 38 to be movable relative to each other, specifically to be capable of rotating or swiveling.

The aforesaid joints will be explained in tends of their electric motors (actuators). The hip joint JH comprises an electric motor 40 with a rotary shaft rotatable around a Z axis (yaw axis; gravity axis of the robot 10), an electric motor 42 with a rotary shaft rotatable around the Y axis (pitch axis; lateral axis of the robot 10), and an electric motor 44 with a rotary shaft rotatable around the X axis (roll axis; longitudinal axis of the robot 10) so as to have three degrees of freedom. Thus, the thigh link 30 is connected to the body 14 through the hip joint JH and can rotate relative to the body 14 around the X, Y and Z axes.

The knee joint JK comprises an electric motor 46 with a rotary shaft rotatable around the Y axis so as to have one degree of freedom. In other words, the thigh link 30 is connected to the shank link 32 through the knee joint JK and can rotate relative to the shank link 32 around the Y axis.

The foot (ankle) joint JA comprises an electric motor 48 with a rotary shaft rotatable around the Y axis and an electric motor 50 with a rotary shaft rotatable around the X axis so as to have two degrees of freedom. In other words, the shank link 32 is connected to the foot member 34 through the ankle joint JA and can rotate relative to the foot member 34 around the X and Y axes.

Thus, each of the left and right legs 12 has six rotary shafts (degrees of freedom) including three joints, so that overall the legs 12 have a total of twelve rotary shafts. In the following, the twelve actuators, i.e., the electric motors 40 etc., that drive the legs 12 are called the "leg actuators" and designated by a symbol AL. By controlling the operation of the leg actuators AL, desired movements are imparted to the legs 12.

The left and right arms 20 are each equipped with an upper arm link 52 and a forearm link 54. The upper arm link 52 is connected to the body 14 through a shoulder joint JS. The upper arm link 52 and forearm link 54 are connected through an elbow joint JE, and the forearm link 54 and hand 22 are connected through a wrist joint JW.

The shoulder joint JS comprises an electric motor 56 with a rotary shaft rotatable around the Y axis, an electric motor 58 with a rotary shaft rotatable around the X axis, and an electric motor 60 with a rotary shaft rotatable around the Z axis so as to have three degrees of freedom. Thus, the upper arm link 52 is connected to the body 14 through the shoulder joint JS and can rotate relative to the body 14 around the X, Y and Z axes.

The elbow joint JE comprises an electric motor 62 with a rotary shaft rotatable around the Y axis so as to have one degree of freedom. In other words, the upper arm link 52 is connected to the forearm link 54 through the elbow joint JE and can rotate relative to the forearm link 54 around the Y axis.

The wrist joint JW comprises an electric motor 64 with a rotary shaft rotatable around the Z axis, an electric motor 66 with a rotary shaft rotatable around the Y axis, and an electric motor 68 with a rotary shaft rotatable around the X axis so as to have three degrees of freedome. In other words, the forearm link 54 is connected to the hand 22 through the wrist joint JW and can rotate relative to the hand 22 around the X, Y and Z axes.

Thus, each of the left and right arms 20 has seven rotary shafts (degrees of freedom) including three joints, so that overall the arms 20 have a total of fourteen rotary shafts. In the following, the fourteen actuators, i.e., the electric motors 56 etc., that drive the arms 20 are called the "arm actuators" and designated by a symbol AA. By controlling the operation of the arm actuators AA, desired movements are imparted to the arms 20.

Each hand 22 is provided with five fingers 70. The fingers 70 are operable by a hand actuator AH (shown in FIG. 4), and by operating in coordination with movements of the arm 20 can grasp objects, point in a direction suitable for the occasion, and perform other actions.

The head 16 is connected to the body 14 through a neck joint JN. The neck joint JN comprises an electric motor 72 with a rotary shaft rotatable around the Z axis and an electric motor 74 with a rotary shaft rotatable around the Y axis so as to have two degrees of fredome. The head 16 can be faced in a desired direction by controlling the operation of head actuators AN, namely the electric motors 72 and 74.

The electric motors 40 and other motors comprising the leg actuators AL, arm actuators AA, hand actuators AH, and head actuators AN are all DC servomotors.

A force sensor (six-axis force sensor) 76 attached to each of the left and right legs 12 between the foot member 34 and ankle joint JA outputs signals representing the floor reaction force components Fx, Fy and Fz of three directions and the moment components Mx, My and Mz of three directions acting on the leg 12 from the floor. A similar force sensor 78 attached to each of the left and right arms 20 between the hand 22 and the wrist joint JW outputs signals representing external force components Fx, Fy and Fz of three directions and moment components Mx, My and Mz of three directions acting on the arm 20.

An inclination sensor 80 installed on the body 14 outputs signals indicating an inclination of the body 14 from the vertical axis, more specifically, state quantities of the body 14 such as its inclination angle and angular velocity. The head 16 is equipped with two (left and right) CCD cameras 82 for taking and outputting stereographic images of the robot 10 surroundings and with an speech input/output unit 84 comprising a microphone 84a and a speaker 84b.

As shown in FIG. 4, the electric motor 40 and other motors are individually provided with rotary encoders 86 (not shown in FIGS. 1 to 3) responsive to rotation angles to output signals proportional to the joint angles, and the body 14 is provided with gyroscopic sensors (yaw-rate sensors) 88 (not shown in FIGS. 1 to 3) for producing outputs representing the angular accelerations around the X, Y and Z axes, respectively.

As shown in FIG. 3, the body 14 is further equipped with a hip-level camera 90 that produces a near-infrared laser beam forward and downward, detects light reflected from objects on the floor, for example, and produces outputs indicating the distances to and directions of the detected objects.

As shown in FIG. 4, a number of ultrasonic sensors 92 (not shown in FIGS. 1 to 3) are arranged around the body 14. The ultrasonic sensors 92 radially emit ultrasonic signals into the surroundings and produce outputs indicating the directions, positions and distances of people and other obstacles present in the surroundings.

As shown in FIG. 4, the outputs of the sensors and the like are inputted to the ECU 26. The ECU 26 is a microcomputer including a CPU, input/output circuit, ROM, RAM, and the like, none of which are shown in the drawing. Based on the input values, the ECU 26 calculates control values (manipulated variables) as current values, and controls the operation of the leg actuators AL, arm actuators AA and the like by using drive circuits (not shown) to supply them with boosted voltages from a booster (not shown) that boosts (increases) the output of the battery 28.

The robot 10 is configured to be capable of travel operation in addition to walking operation. As a detailed description in this regard can be found, for example, in the applicant's earlier-filed Japanese Patent 4246638, explanation is omitted here.

The ECU 26 also functions as a control unit for controlling operation of the speech input/output unit 84, which by means of a suitable method recognizes the content of a human utterance inputted through the microphone 84a of the speech input/output unit 84, generates a response to the utterance, and utters the generated response from the speaker 84b.

Figure 5:
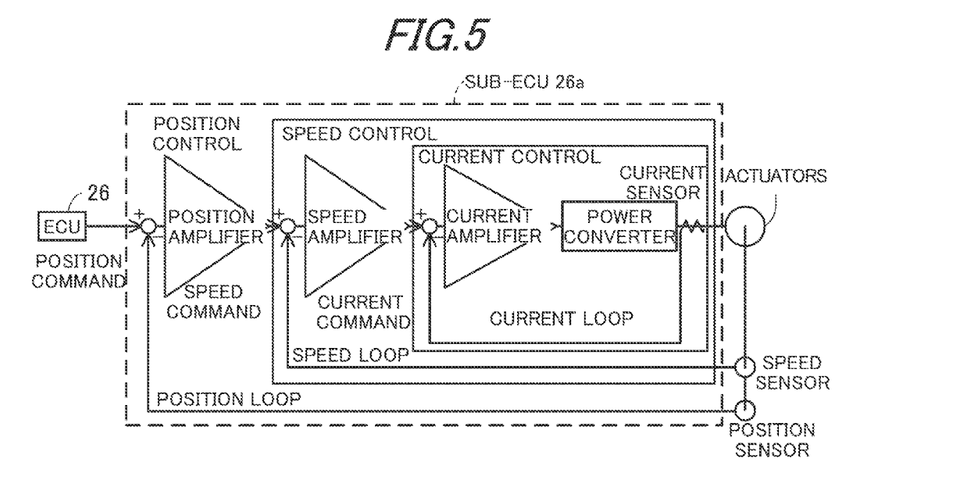
FIG. 5 is a block diagram showing the control system of the robot shown in FIG. 1.

FIG. 5 is a block diagram showing the control of the robot shown in FIG. 1.

As illustrated, the control system of this embodiment is concretely configured as a feedback control system composed of a distributed control system with a host system comprising the ECU 26 and a subordinate system comprising one or more sub-ECUs (controller) 26a deployed respectively at the leg actuators AL, arm actuators AA, hand actuators AH and head actuators AN. The ECU 26 and each of the sub-ECUs 26a can communicate with each other.

The sub-ECU 26a receives a command, more specifically a position command (desired value), from the ECU 26 and calculates a speed command by multiplying a deviation between an actual position obtained from outputs of the position sensor, i.e., outputs of the rotary encoders 86 deployed at the electric motors 40 or other associated motors, and the position command by a suitably calculated (retrieved) position gain Kp of a position amplifier. The sub-ECU 26a further calculates a current command by multiplying a deviation between an actual speed obtained from outputs of the speed sensor, i.e., outputs of the rotary encoders 86, and the calculated speed command outputted from the position amplifier by a suitably calculated speed gain Kv of a speed amplifier.

The sub-ECU 26a then calculates a control value (manipulated variable) by multiplying a deviation between actual current outputted from a power converter and detected by a current sensor (not shown in FIG. 4 etc.) and the calculated current command outputted from the speed amplifier by a suitably calculated current gain Ki of a current amplifier. As explained above, the sub-ECU 26a calculates control values using feedback control based on the commands (position command, calculated speed command, calculated current command) and detected values (actual position, actual speed, and actual current detected by sensors) and supplies them to the actuators, e.g., the electric motors 40, to control their operation.

Figure 6:
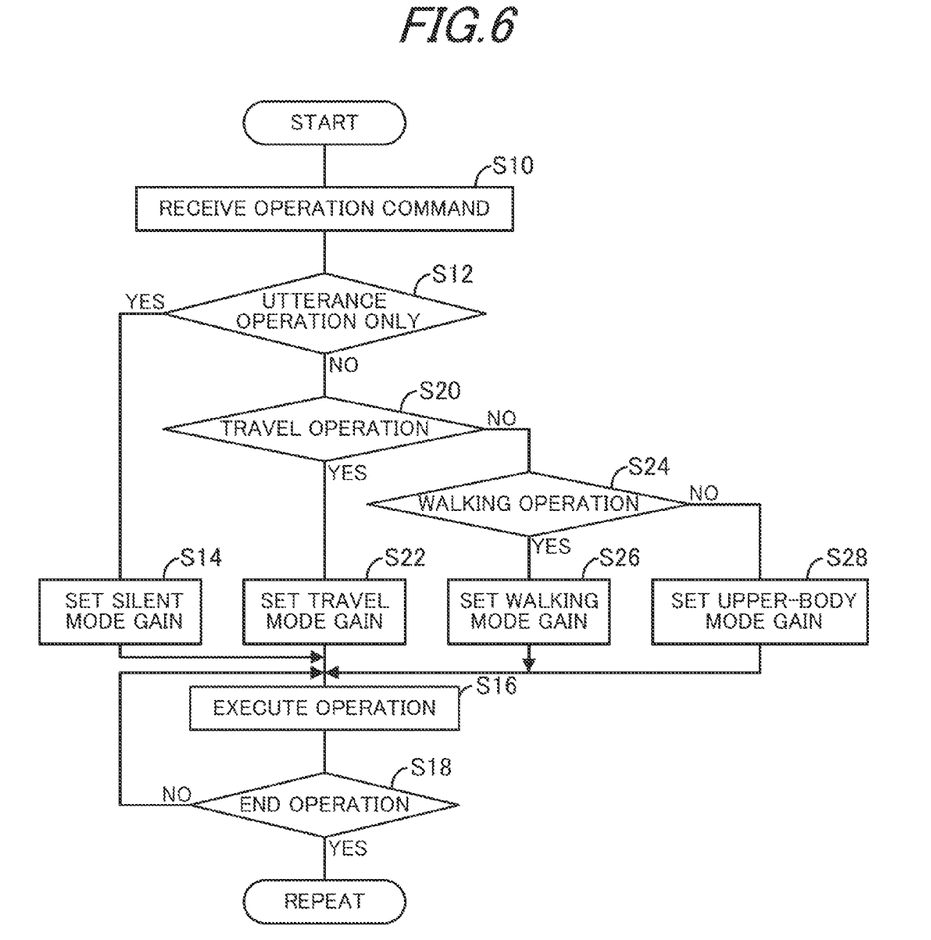
FIG. 6 is a flowchart showing the operation of the apparatus for controlling the mobile robot according to the embodiment.

FIG. 6 is a flowchart showing the operation of the apparatus for controlling the mobile robot, more specifically the sub-ECUs 26a described above, according to this embodiment.

The sub-ECUs 26a deployed at the leg actuators AL and the like individually execute the program shown in the drawing at predetermined intervals (e.g., every 5 msec).

The flowchart will be explained. In S (Step: Processing step) 10, an operation command is received from the host system ECU 26. The operation commands are generated in accordance with a predefined action plan and mean processes such as indicated in S20, S24 and so forth.

Next, the program proceeds to S12, in which it is determined whether only utterance operation (more exactly, only control of the utterance operation) is involved, in other words, whether only control the operation of the speech input/output unit 84 is involved. When the result is affirmative, the program proceeds to S14, in which silent mode gains are set, and to S16, in which the operation (utterance operation) is continuously executed until determined in S18 to have ended.

On the other hand, when the result in S12 is negative, the program proceeds to S20, in which it is determined whether the operation requested by the operation command is travel operation operated by the leg actuators AL (more exactly, control of the travel operation). When the result in S20 is affirmative, the program proceeds to S22, in which travel mode gains are set, and then advances to S16 and onward.

When the result in S20 is negative, the program proceeds to S24, in which it is determined whether the operation requested by the operation command is walking operation operated by the leg actuators AL (more exactly, control of walking operation). When the result in S24 is affirmative, the program proceeds to S26, in which walking mode gains are set, and then advances to S16 onward.

When the result in S24 is negative, the operation requested by the operation command is upper-body operation, in other words, control of the upper-body operation (i.e., working operation) operated by some or all the arm actuators AA, hand actuators AH and head actuators AN using at least one of the body 14, arms 20, head 16 and hands 22, more specifically using at least the arms (work mechanism) 20. The program therefore proceeds to S28, in which upper-body mode gains are set, and then advances to S16 onward.

Figure 7:
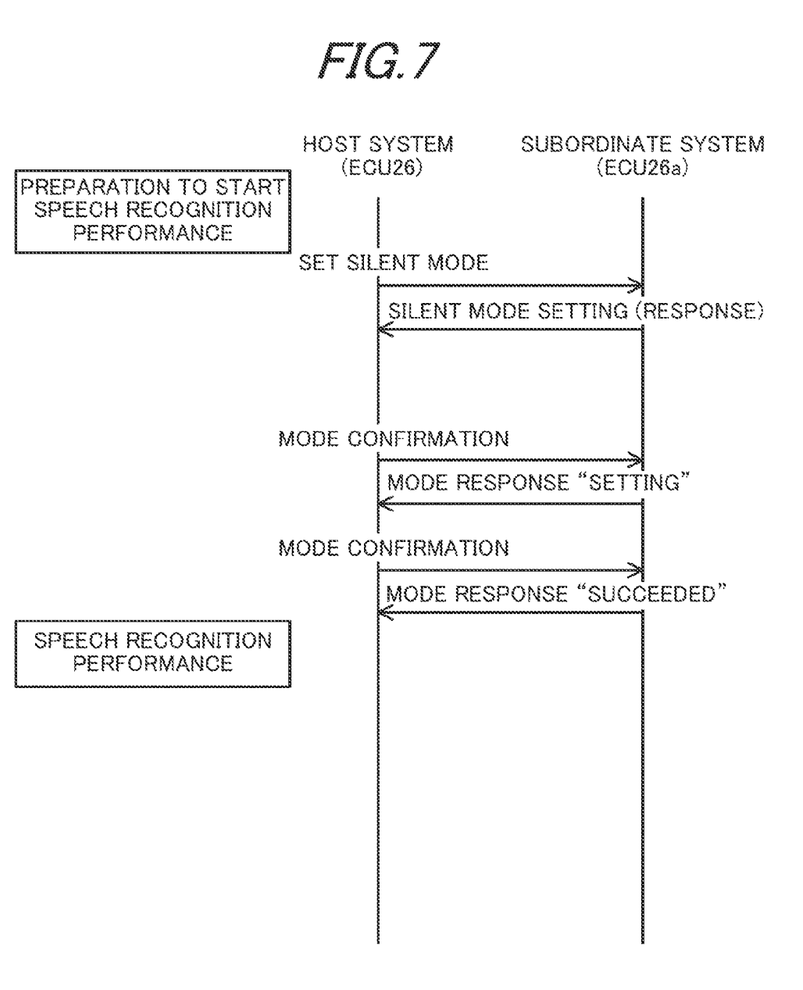
FIG. 7 is an explanatory diagram showing the silent mode setting of the flowchart of FIG. 6.
Figure 8:
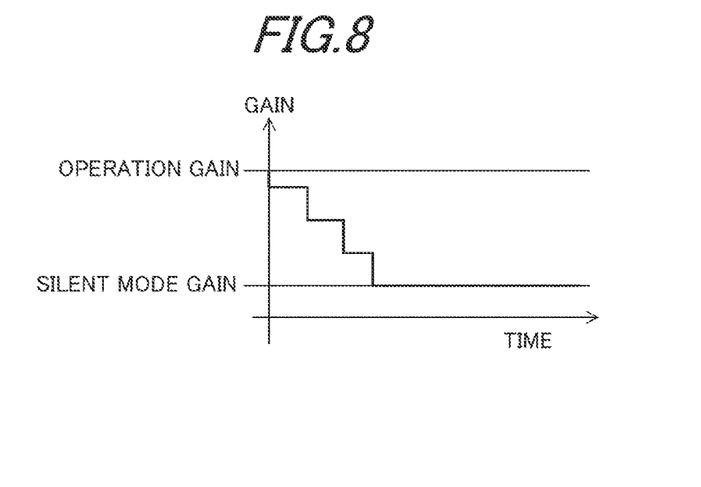
FIG. 8 is an explanatory diagram showing the operation when gains are reduced from operation gains to silent mode gains by the processing of the flowchart of FIG. 6.
Figure 9:
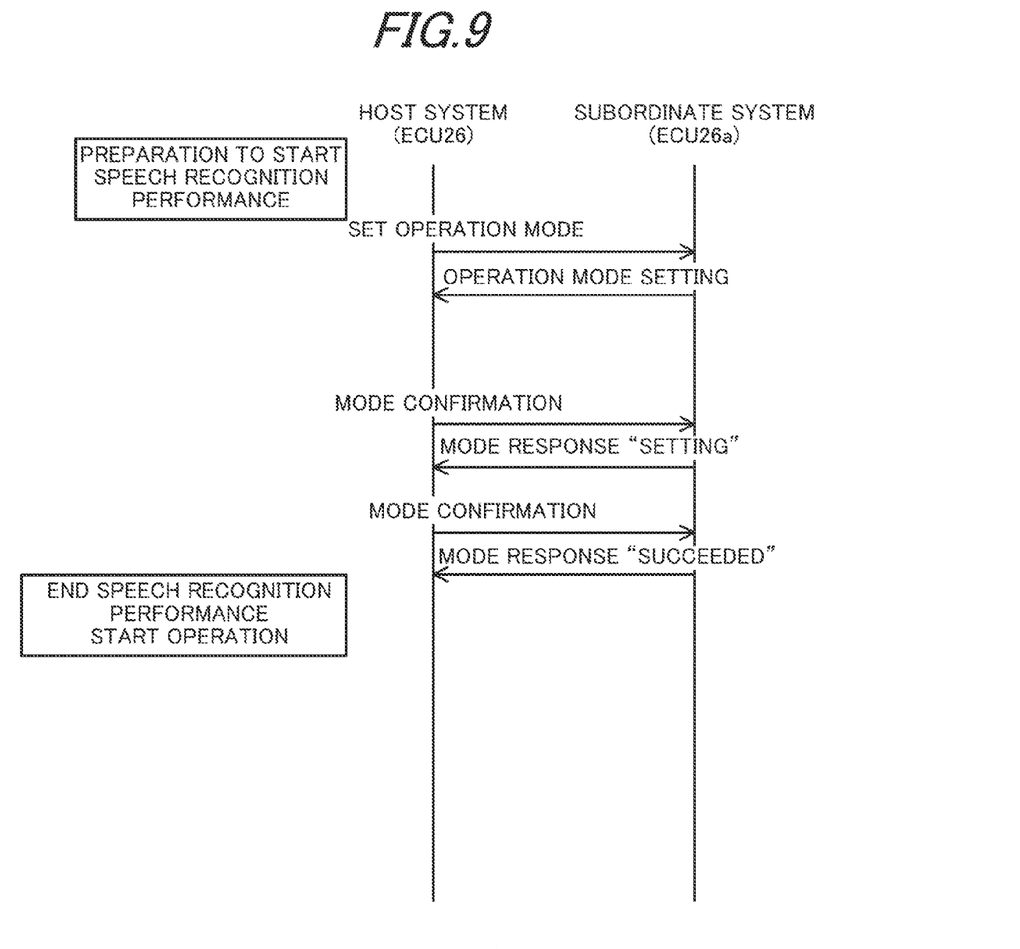
FIG. 9 is an explanatory diagram similar to FIG. 7 showing the operation gain settings of the flowchart of FIG. 6.
Figure 10:
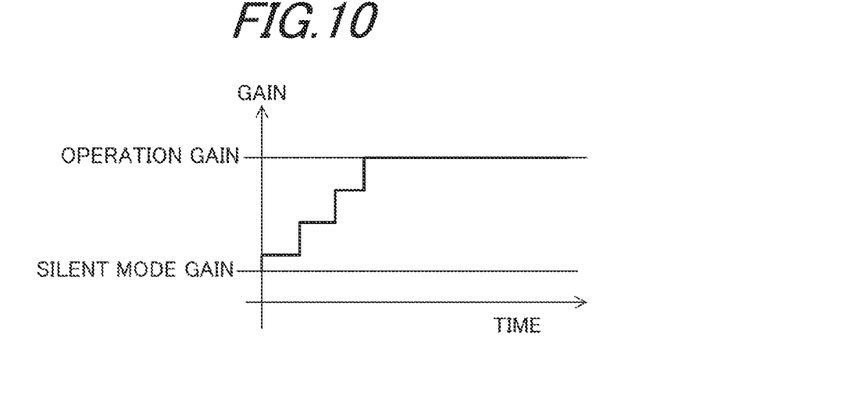
FIG. 10 is an explanatory diagram showing the operation when gains are increased from silent mode gains to operation gains by the processing of the flowchart of FIG. 6.

FIG. 7 is an explanatory diagram showing the silent mode setting of S14 of the flowchart of FIG. 6. FIG. 8 is an explanatory diagram showing the operation when gains are reduced from operation gains (travel mode gains of S22, walking mode gains of S26, upper-body mode gains of S28) to silent mode gains by the processing of the flowchart of FIG. 6. FIG. 9 is an explanatory diagram similar to FIG. 7 showing the operation gain settings of S22, S26, S28. FIG. 10 is an explanatory diagram showing the operation when gains are increased from silent mode gains to operation gains by the processing of the flowchart of FIG. 6.

The foregoing explanation of the flowchart of FIG. 6 focuses on the operation of the sub-ECUs 26a in S12 onward after receiving the operation command from the host system ECU 26 in S10. To be more specific, however, as shown in FIGS. 7 and 9, the setting of gains is also performed in response to commands received from the ECU 26.

Figure 11:
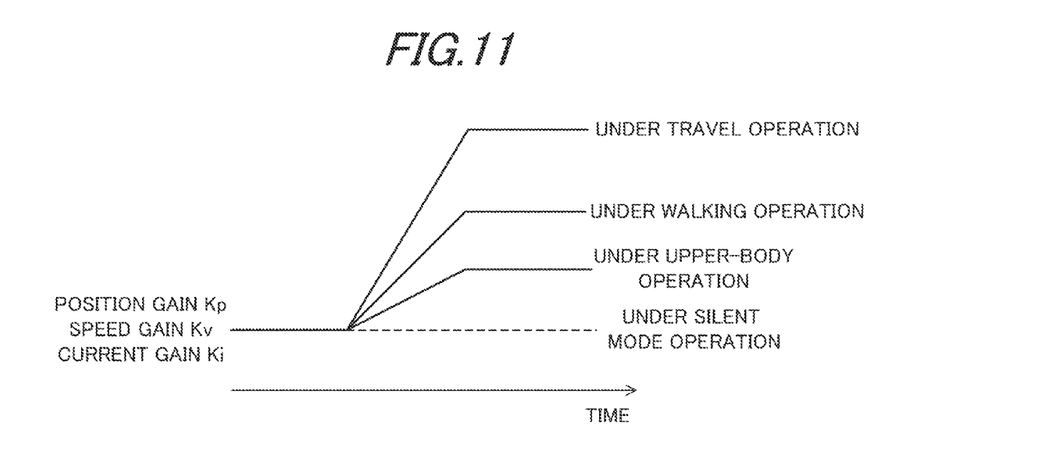
FIG. 11 is an explanatory diagram showing gain characteristics of silent mode gains and operation gains of the flowchart of FIG. 6.

FIG. 11 is an explanatory diagram showing the characteristics (gain patterns) of the silent mode gains of S14 and the operation gains (travel mode gains of S22, walking mode gains of S26, and upper-body mode gains of S28).

As shown in FIGS. 8, 10 and 11, the silent mode gains are defined at the smallest values among all the gains, including the operation gains. Specifically, when it is determined in S12 of the flowchart of FIG. 6 that only utterance operation (speech input/output unit 84 operation) is to be controlled, the gains Kp, Kv, Ki to be supplied to at least some of the multiple actuators (leg actuators AL, arm actuators AA, hand actuator AH, and head actuators AN), more specifically to all thereof, are calculated at minimum values.

The control values are calculated as current values by multiplying the deviations of the detected values (actual values) of the leg actuators AL and other actuators from the corresponding commands (desired values) by the gains Kp, Kv, Ki so that the detected values become equal to the desired values. Therefore, the calculation of gains at minimum values decreases the control values to enable reduction of the driving sound of the electric motors 40 to 50 of the leg actuators AL.

With this, it becomes possible to improve the speech recognition performance of human voice utterances and the like inputted through the microphone 84a of the speech input/output unit 84 of the robot 10. In addition, utterances of the robot 10 outputted through the speaker 84b can be more easily perceived by human listeners in proportion as the driving sound decreases, so that speech recognition performance can also be improved on the human side.

Moreover, as shown in FIG. 11 with regard to walking operation and upper-body operation (working operation), the values of the gain characteristics for these types of operations are defined to decrease in the order from walking operation to upper-body operation. More specifically, with regard to travel operation, walking operation and upper-body operation, the values of the gain characteristics for these three types of operations are defined to decrease in the order from travel operation to walking operation to upper-body operation.

In other words, although three types of operation gains are defined in this embodiment, this is because the robot 10 is capable of travel operation, and it suffices to define only two types, for walking operation and upper-body operation, since the object of the invention can be achieved with only these two types.

Figure 12:
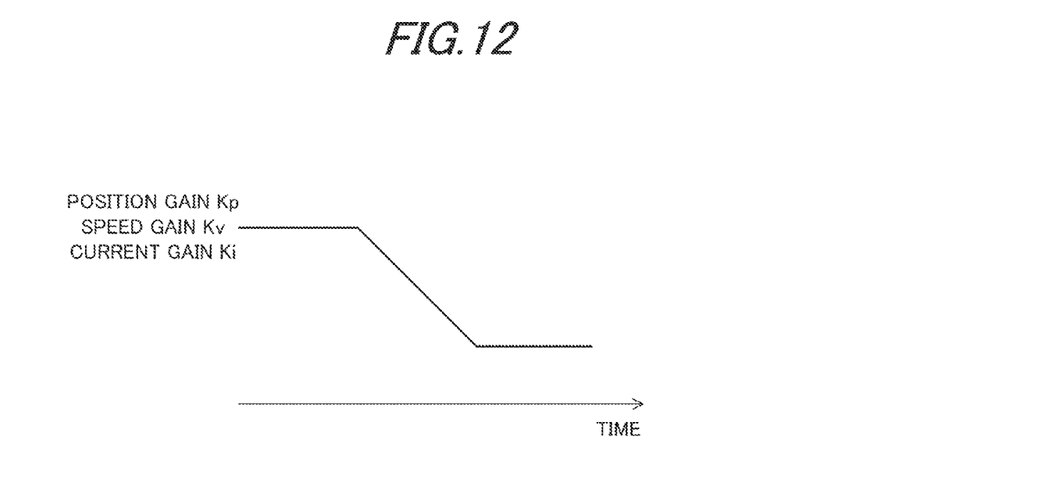
FIG. 12 is an explanatory diagram showing gain characteristics of the gains shown in FIG. 11 as a function of time.

Moreover, as shown in FIG. 12, the values of the gain characteristics are defined to decrease smoothly with time (and though not shown, increase similarly). More specifically, as shown in FIGS. 8 and 10, the values of the gain characteristics are defined to increase and decrease incrementally every predetermined time interval (e.g., every 1 msec). In the operation execution processing of S16, therefore, the respective gain characteristics can be retrieved to calculate the gains of the control values to be supplied to the associated actuators.

As stated above, the embodiment of this invention is configured to have an apparatus (and method) for controlling a mobile robot 10 having a body 14, leg locomotion mechanisms (legs) 12 for walking operation and work mechanisms (arms) 20 for working operation both connected to the body, a plurality of actuators (electric motors 40 . . . 50, 56 . . . 68 comprising the leg actuators AL, arm actuators AA, hand actuators AH, and head actuator AN) for driving the leg locomotion mechanisms and work mechanisms, a speech input/output unit 84 including a microphone 84a and a speaker 84b, and a controller (ECU 26, sub-ECUs 26a) adapted to control the operation of the locomotion mechanisms 12 and work mechanisms 20 by supplying the plurality of actuators with a control value (manipulated variable) which is calculated by multiplying a deviation between a detected value and a desired value by a gain and to control operation of the speech input/output unit 84 to recognize human voice inputted through the microphone 84a and utter a generated response to the recognized human voice from the speaker 84b, wherein the improvement comprises: the controller calculates the gain of the control value to be supplied to at least one of the plurality of actuators at a minimum value when controlling only the operation of the speech input/output unit 84 (S10, S12, S14, S16).

With this, since the gains of the control value is calculated at the minimum values when controlling solely the operation of the speech input/output unit 84, it becomes possible to reduce the driving sound of the actuators, such as the leg actuators AL, thereby improving the speech recognition performance of the speech input/output unit 84.

In the apparatus (and method), as shown in FIG. 11, the controller includes gain characteristics defined for at least the walking operation and the working operation whose values are decreased in order from the walking operation to the working operation, and calculates the gain of the control value to be supplied to at least one of the plurality of actuators by retrieving the values of the defined gain characteristics in a case of controlling one of the walking operation and the working operation with the operation of the speech input/output unit (S 10, S12, S14, S16).

In other words, since the required driving force decreases in the order from walking operation to working operation, the value of the gain characteristics decreases accordingly, and the values of the gain characteristics are retrieved to calculate the gains. As a result, even in the case of not controlling only the operation of the speech input/output unit 84, i.e., in the case of controlling one of the walking operation and the working operation with the operation of the speech input/output unit 84, it is possible to constrain the gains within a necessary limit and reduce the driving sound of the actuators in portion, so that the speech recognition performance of the speech input/output unit 84 can also be improved in portion.

In the apparatus (and method), the locomotion mechanisms 12 comprises leg locomotion mechanisms for walking operation and travel operation, and, as shown in FIG. 11, the controller includes gain characteristics defined for the travel operation, the walking operation and the working operation whose values are decreased in order from the travel operation to the walking operation to the working operation and calculates the gain of the control value to be supplied to at least one of the plurality of actuators by retrieving the values of the defined gain characteristics in a case of controlling one of the travel operation, walking operation and the working operation with the operation of the speech input/output unit (S12, S14 S16, S18).

In other words, since the required driving force decreases in the order from travel operation to walking operation to working operation, the characteristics of the gains decreases accordingly, and the characteristics of the gains are retrieved to calculate the gains. As a result, even in a case of not controlling only the operation of the speech input/output unit 84, i.e., in the case of controlling one of the travel operation, the walking operation and the working operation with the operation of the speech input/output unit 84, it is possible to constrain the gains within a necessary limit and reduce the driving sound of the actuators in portion, so that the speech recognition performance of the speech input/output unit 84 can also be improved in portion.

It is noted that although three types of operation gains are defined in this embodiment, this is because the robot 10 is capable of travel operation, and it suffices to define only two types, for walking operation and upper-body operation, since the object of the invention can be achieved with only these two types.

In the apparatus (and method), as shown in FIG. 11, since the values of the gain characteristics are defined as a function of time, it becomes possible to smoothly define the values of the gain characteristics to increase and decrease with time, thereby enabling smooth control of the actuator operations.

In the apparatus (and method), as shown in FIGS. 8 and 10, since the values of the gain characteristics are increased and decreased incrementally every predetermined time interval, it becomes possible to define the values of the gain characteristics to increase and decrease more smoothly with time, thereby enabling smooth control of the actuator operations.

Although the embodiment was explained taking a two-legged mobile robot as an example of the mobile robot, the robot is not limited to this type and the robot can instead be, for example, having more than two-legs or a wheels type or crawling type.

Japanese Patent Application No. 2012-145688, filed on Jun. 28, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling a mobile robot having a body, leg locomotion mechanisms for walking operation and work mechanisms for working operation both connected to the body, a first actuator for driving the leg locomotion mechanisms, a second actuator for driving the work mechanisms, a speech input/output unit including a microphone and a speaker, and a controller adapted to control the operation of the leg locomotion mechanisms and work mechanisms by supplying the first and second actuators with a control value which is calculated by multiplying a deviation between a detected value and a desired value by a gain and to control operation of the speech input/output unit to recognize human voice inputted through the microphone and utter a generated response to the recognized human voice from the speaker, wherein:
the controller selects one of a silent mode for controlling only the operation of the speech input/output unit, a walking mode for driving the leg locomotion mechanisms to control a walking operation, and a working mode for driving the work mechanisms to control a working operation, and calculates the gain of the control value to be supplied to the first and second actuators corresponding to the selected mode, and wherein the controller calculates the gain at a minimum value when selecting the silent mode, and calculates a smaller gain when selecting the working mode than when selecting the walking mode.

2. The apparatus according to claim 1, wherein the leg locomotion mechanisms comprises leg locomotion mechanisms for travel operation, and
the controller selects one of the silent mode, the walking mode, the working mode, and a travel mode for driving the leg locomotion mechanisms to control a travel operation, and calculates a bigger gain when selecting the travel mode than when selecting the walking mode.

3. The apparatus according to claim 1, wherein values of gain characteristics in the walking mode and the working mode are defined as a function of time.

4. The apparatus according to claim 2, wherein values of gain characteristics in the walking mode, the working mode, and the travel mode are defined as a function of time.

5. The apparatus according to claim 3, wherein the values of the gain characteristics are increased and decreased incrementally every predetermined time interval.

6. The apparatus according to claim 4, wherein the values of the gain characteristics are increased and decreased incrementally every predetermined time interval.

7. A method for controlling a mobile robot having a body, leg locomotion mechanisms for walking operation and work mechanisms for working operation both connected to the body, a first actuator for driving the leg locomotion mechanisms, and a second actuator for driving the work mechanisms, a speech input/output unit including a microphone and a speaker, and a controller adapted to control the operation of the locomotion mechanisms and the work mechanisms by supplying the first and second actuators with a control value which is calculated by multiplying a deviation between a detected value and a desired value by a gain and to control operation of the speech input/output unit to recognize human voice inputted through the microphone and utter a generated response to the recognized human voice from the speaker, comprising the step of:
selecting one of a silent mode for controlling only the operation of the speech input/output unit, a walking mode for driving the leg locomotion mechanisms to control a walking operation, and a working mode for driving the work mechanisms to control a working operation, and calculating the gain of the control value to be supplied to of the first and second actuators corresponding to the selected mode,
wherein the step of calculating includes calculating the gain at a minimum value when selecting the silent mode, and calculating a smaller gain when selecting the working mode than when selecting the walking mode.

8. The method according to claim 7, wherein the leg locomotion mechanisms comprises leg locomotion mechanisms for travel operation,
the step of selecting includes selecting one of the silent mode, the walking mode, the working mode, and a travel mode for driving the leg locomotion mechanisms to control a travel operation, and the step of calculating includes calculating a bigger gain when selecting the travel mode than when selecting the walking mode.

9. The method according to claim 7, wherein values of gain characteristics in the walking mode and the working mode are defined as a function of time.

10. The method according to claim 8, wherein values of gain characteristics in the walking mode, the working mode, and the travel mode are defined as a function of time.

11. The method according to claim 9, wherein the values of the gain characteristics are increased and decreased incrementally every predetermined time interval.

12. The method according to claim 10, wherein the values of the gain characteristics are increased and decreased incrementally every predetermined time interval.

* * * * *